US007055986B2

(12) United States Patent
Littleton

(10) Patent No.: US 7,055,986 B2
(45) Date of Patent: Jun. 6, 2006

(54) PROGRAMMABLE LED SPECTRAL LIGHT SOURCE

(75) Inventor: Roy T. Littleton, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 216 days.

(21) Appl. No.: 10/792,850

(22) Filed: Mar. 5, 2004

(65) Prior Publication Data

US 2005/0194516 A1    Sep. 8, 2005

(51) Int. Cl.
*F21V 9/16* (2006.01)
*F21V 29/00* (2006.01)

(52) U.S. Cl. ............... 362/231; 362/235; 362/251; 362/276; 362/294; 362/373

(58) Field of Classification Search ........ 362/230–231, 362/235–236, 276, 373, 800, 802, 249, 251, 362/294
See application file for complete search history.

(56) References Cited

U.S. PATENT DOCUMENTS

| | | | | | |
|---|---|---|---|---|---|
| 5,608,213 | A | * | 3/1997 | Pinkus et al. | 250/252.1 |
| 5,679,949 | A | * | 10/1997 | Task et al. | 250/252.1 |
| 5,686,210 | A | * | 11/1997 | Sharman | 430/30 |
| 5,783,909 | A | * | 7/1998 | Hochstein | 315/159 |
| 5,982,957 | A | * | 11/1999 | DeCaro et al. | 382/312 |
| 6,127,783 | A | * | 10/2000 | Pashley et al. | 315/149 |
| 6,441,558 | B1 | * | 8/2002 | Muthu et al. | 315/149 |
| 6,759,814 | B1 | * | 7/2004 | Vogel et al. | 315/312 |
| 2003/0233138 | A1 | * | 12/2003 | Spooner | 607/93 |

OTHER PUBLICATIONS

J. Res. Natl. Inst. Stand. Technol. 107, 363-371 Jul. 2002, Development of a Tunable LED-Based Colorimetric Source, Steven W. Brown, et. al.
Nist Tech Beat Apr. 23, 2004, http://www.nist.gov/public_affairs/techbeat/tb2004_0423.htm Portable 'Rainbow' Source Improves Color Calibrations, Laura Ost.

* cited by examiner

*Primary Examiner*—Alan Cariaso
*Assistant Examiner*—Jason Han
(74) *Attorney, Agent, or Firm*—Arthur Samora; Andrew Romero

(57) ABSTRACT

An apparatus for emulating various known night sky illumination conditions. The apparatus comprises a plurality of electrically-powerable LEDs which are disposed in an array and have respective spectral curves centered at different wavelengths in the visible to the short wave infrared wavebands, and means for fixing the temperatures of the LEDs to avoid temperature-induced changes in their spectral curves. Additionally, the apparatus includes means for varying the light intensities of the individual LEDs so that the combination of their spectral curves matches the spectrum of the known night sky illumination condition to be emulated, and means for regulating the total amount of light collected from the array so that the cumulative spectrum has the same intensity as the known night sky illumination condition to be emulated.

18 Claims, 1 Drawing Sheet

PROGRAMMABLE LED SPECTRAL LIGHT SOURCE

GOVERNMENT INTEREST

The invention described herein may be manufactured, used, sold, imported, and/or licensed by or for the Government of the United States of America.

BACKGROUND OF THE INVENTION

This invention relates in general to light sources, and more particularly, to programmable light sources.

The performance of passive low-light-level imaging systems that operate in the visible, near infrared, and short wavelength infrared spectral bands has been investigated for the past several years. Although such devices operate under low power, exhibit low dark current, and retain high system resolution under moonlight conditions, they are limited under low light level conditions.

Typically, their performance is evaluated in a laboratory setting using a 2856° K blackbody—a tungsten filament—as the radiation source, which can correlate reasonably well with night sky measurements below 1 micron. However, it does not correlate reasonably well with night sky measurements above 1 micron. Night sky spectral irradiance data indicate that a moonless sky produces over an order of magnitude more photons in the short-wave infrared (1 to 2 micron) waveband than in the visible and near infrared (0.4 to 1.0 micron) waveband. Therefore, the use of a single broadband 2856° K source in a laboratory to evaluate imaging systems that operate beyond 1 micron is insufficient.

SUMMARY OF THE INVENTION

It is therefore an object of this invention to accurately evaluate in a laboratory setting passive low-light-level imaging systems that operate in the visible, near infrared, and short wavelength infrared spectral bands.

This and other objects of the invention are achieved in one aspect by an apparatus for emulating various known spectral signatures, particularly night sky illumination conditions. The apparatus comprises a plurality of electrically-powerable LEDs which are disposed in an array and have respective spectral curves centered at different wavelengths in the visible to the short wave infrared wavebands, and means for fixing the temperatures of the LEDs to avoid temperature-induced changes in their spectral curves. Additionally, the apparatus includes means for varying the light intensities of the individual LEDs so that the combination of their spectral curves matches the spectrum of the known night sky illumination condition to be emulated, and means for regulating the total amount of light collected from the array so that the cumulative spectrum has the same intensity as the known night sky illumination condition to be emulated.

Another aspect of the invention involves a method of emulating various spectral signatures comprising the steps of: (a) electrically-powering a plurality of electrically-powered LEDs in an array, the LEDs having respective spectral curves centered at different wavelengths in the visible to the short wave infrared wavebands; (b) fixing the temperatures of the LEDs to avoid temperature-induced changes in their spectral curves; (c) varying the light intensities of the individual LEDs so that the combination of their spectral curves matches the spectrum of the known night sky illumination condition to be emulated; and (d) regulating the total amount of light collected from the array so that the cumulative spectrum has the same intensity as the known night sky illumination condition to be emulated.

The invention can accurately emulate various night sky illumination conditions by emitting spectra in a laboratory setting to match that of full moon, partial moon, starlight and overcast starlight conditions.

Additional advantages and features will become apparent as the subject invention becomes better understood by reference to the following detailed description when considered in conjunction with the accompanying drawings wherein:

BRIEF DESCRIPTION OF THE DRAWINGS

The sole FIGURE is a schematic illustration of an illumination conditions-emulating apparatus embodying the invention.

WRITTEN DESCRIPTION OF THE PREFERRED EMBODIMENT

Figure 1:
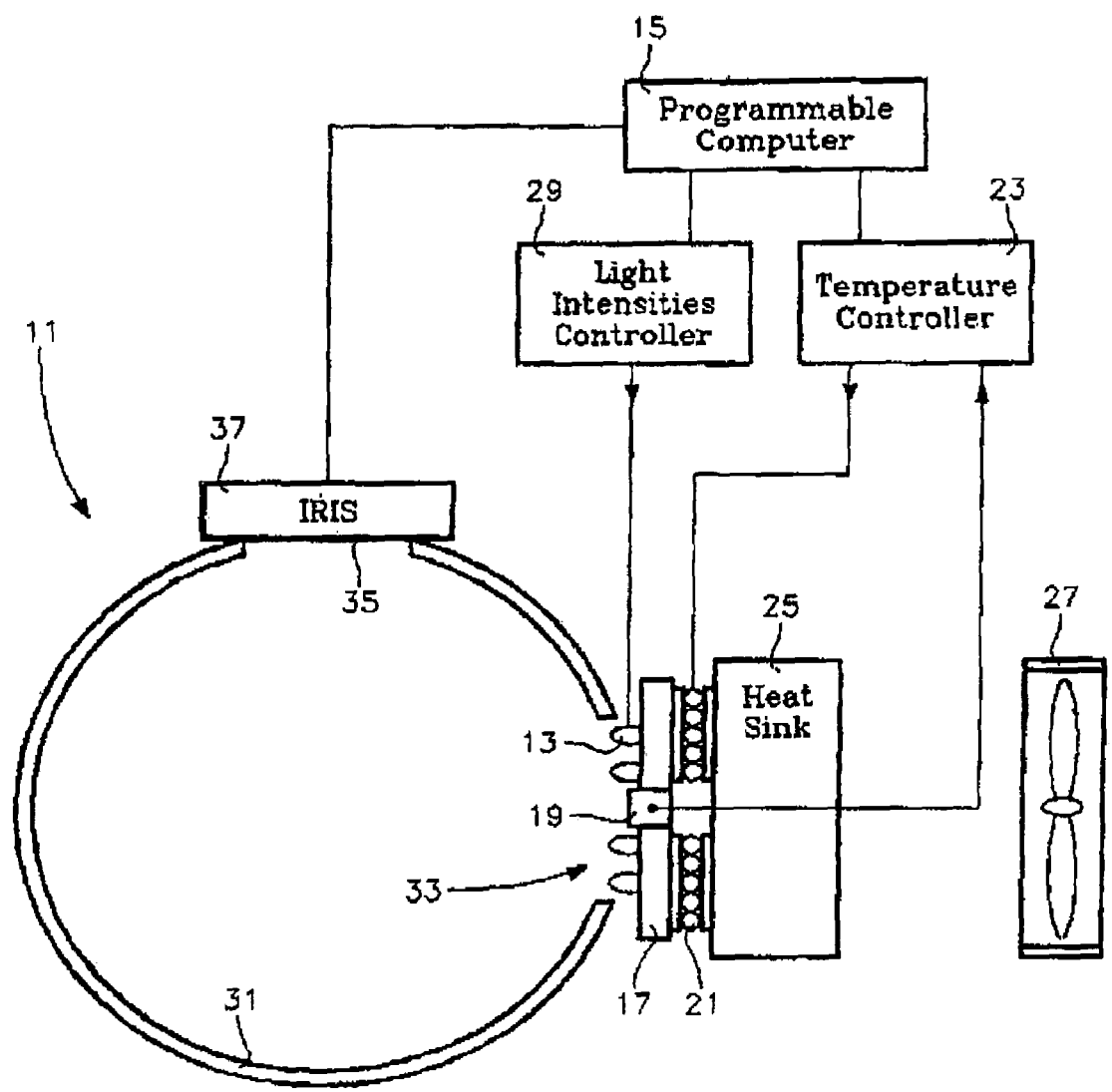

The FIGURE shows the apparatus 11 for emulating various known spectral signatures such as night sky illumination conditions. The apparatus 11 comprises an electrically-powered array 13 of LEDs which have respective spectral curves centered at different wavelengths in the visible to the short wavelength infrared wavebands, specifically in the 0.4 to 2.5 micron range, and means for fixing the temperatures of the LEDs to avoid temperature-induced changes in their spectral curves. Additionally, the apparatus 11 includes means for varying the light intensities of the individual LEDs so that the combination of their spectral curves matches the spectrum of the known night sky illumination condition to be emulated, and means for regulating the total amount of light collected from the array so that the cumulative spectrum has the same intensity as the known night sky illumination condition to be emulated.

While the temperature-fixing means may take a variety of forms, conveniently it may take the form shown of a programmable computer 15, a copper plate 17 thermally connected to the LED array 13, a temperature sensor 19 that is in thermal communication with copper plate 17 and electrically connected to temperature controller 23. A plurality of thermo-electric coolers 21 connected to the copper plate for providing an input to the programmable computer, a temperature controller 23 connected to the computer, to the temperature sensor 19 and to the coolers, a heat sink 25 connected to the coolers, and a cooling fan 27 disposed next to the coolers.

While the light-intensities-varying means may take a variety of means, conveniently it may take the form shown of the programmable computer 15, and a light-intensities controller 29 connected between the LED array 13 and the computer.

While the light-regulating means may take a variety of forms, conveniently it may take the form shown of the programmable computer 15, an integrating sphere 31 attached to the LED array 13, the sphere having an input opening 33 and an output opening 35, and an iris 37 mounted on the output opening of the sphere and connected to the programmable computer.

For the materials of the present invention, the preferred temperature sensor is a Model W2142 platinum resistance thermometer device manufactured by Omega. The preferred thermo-electric coolers are model CP1.0-71-05L-1 coolers made by Melcor, while LEDs manufactured by Roithner LasertechniK, of Vienna can be used. The preferred integrating sphere is a custom six-inch sphere mad by Spectra-Physics. The light intensity controller and temperature controller can be manufactured using readily available commercial electronic components in a manner known by the skilled artisan.

In operation, the array 13 of LEDs is electrically-powered and the temperatures of the LEDS are fixed to avoid temperature-induced changes in their spectral curves. This is done by monitoring heat-generated temperature changes in the temperature of the copper plate 17 and thus in the temperature of the LED array 13 with the temperature sensor 19. Temperature sensor 19 provides an input to the temperature controller according to the temperature of the copper plate. The temperature sensor, in response to a command from programmable computer 15 to maintain a predetermined temperature, uses the temperature sensor input to drive the thermo-electric coolers 21 and cool the LED array, by removing heat generated by the thermo-electric coolers with the heat sink 25 and the cooling fan 27. With this configuration, the LED array temperature is continuously driven to be equal to a fixed predetermined temperature.

Next, the integrating sphere 31 collects at its input opening 33 light from the LED array 13 and outputs at its output opening 35 a uniform distribution of the light collected from the array. The light intensities controller 29 controls the electric power provided to the individual LEDs from their power supply (not shown), and thus their light intensities, in response to commands from the programmable computer 15 so that the combination of their spectral curves matches the known night sky illumination condition to be emulated, and the iris 37 adjusts the size of the output opening 35 of the integrating sphere 31 in response to commands from the programmable computer 15 so that the cumulative spectrum has the same intensity as the known night sky illumination condition to be emulated.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the united states is:

1. An apparatus for emulating spectral signatures comprising:
    a plurality of electrically-powerable LEDs disposed in an array, the LEDs having respective spectral curves centered at different wavelengths in the visible to the short wave infrared wavebands;
    means for fixing the temperatures of the LEDs to avoid temperature-induced changes in their spectral curves;
    means for varying the light intensities of the individual LEDs so that the combination of their spectral curves matches the spectrum of an illumination condition to be emulated; and
    means for regulating the total amount of light collected from the array so that the cumulative spectrum has the same intensity as the illumination condition to be emulated,
    wherein the light-regulating means includes an integrating sphere attached to the LED array, the integrating sphere having an input opening for collecting light from the array and an output opening for outputting a uniform distribution of the collected light, and
    an iris mounted on the output opening of the integrating sphere for adjusting the size of the output opening.

2. The apparatus recited in claim 1 where the temperature-fixing means includes a programmable computer.

3. The apparatus recited in claim 2 wherein the temperature-fixing means includes a copper plate thermally connected to the LED array.

4. The apparatus recited in claim 3 wherein the temperature-fixing means includes a temperature sensor connected to the copper plate and to the computer for monitoring heat-generated changes in the temperature of the LED array and feeding the information to the computer.

5. The apparatus recited in claim 1 wherein the light-intensities-varying means includes a programmable computer.

6. The apparatus recited in claim 5 wherein the light-intensities-varying means includes a light intensity controller connected to the LED array and to the programmable computer for varying the light intensities of the individual LEDs in response to commands from the computer.

7. The apparatus recited in claim 1 wherein the light-regulating means includes a programmable computer.

8. An apparatus for emulating various known spectral signatures comprising:
    a plurality of electrically-powerable LEDs disposed in an array, the LEDs having respective spectral curves centered at different wavelengths in the visible to the short wave infrared wavebands;
    means for fixing the temperatures of the LEDs to avoid temperature-induced changes in their spectral curves;
    means for varying the light intensities of the individual LEDs so that the combination of their spectral curves matches the spectrum of a known night sky illumination condition to be emulated; and
    means for regulating the total amount of light collected from the array so that the cumulative spectrum has the same intensity as the known night sky illumination condition to be emulated,
    wherein the temperature-fixing means includes;
    a programmable computer,
    a copper plate thermally connected to the LED array,
    a temperature sensor connected to the copper plate and to the computer for monitoring heat-generated changes in the temperature of the LED array and feeding the information to the computer, and
    a plurality of thermo-electric coolers connected to the copper plate for cooling the LED array.

9. The apparatus recited in claim 8 wherein the temperature-fixing means includes a temperature controller connected to the computer and to the thermo-electric coolers for driving the coolers in response to commands from the computer to cool the LED array.

10. The apparatus recited in claim 9 wherein the temperature-fixing means includes a heat sink connected to the thermo-electric coolers for removing heat generated by the coolers.

11. The apparatus recited in claim 10 wherein the temperature-fixing means includes a cooling fan disposed next to the thermo-electric coolers for removing heat generated by the coolers.

12. An apparatus for emulating various known spectral signatures comprising:
    a plurality of electrically-powerable LEDs disposed in an array, the LEDs having respective spectral curves centered at different wavelengths in the visible to the short wave infrared wavebands;
    means for fixing the temperatures of the LEDs to avoid temperature-induced changes in their spectral curves;

means for varying the light intensities of the individual LEDs so that the combination of their spectral curves matches the spectrum of a known night sky illumination condition to be emulated; and means for regulating the total amount of light collected from the array so that the cumulative spectrum has the same intensity as the known night sky illumination condition to be emulated, wherein the light-regulating means includes an integrating sphere attached to the LED array, the integrating sphere having an input opening for collecting light from the array and an output opening for outputting a uniform distribution of the collected light, a programmable computer, and an iris mounted on the output opening of the integrating sphere and connected to the programmable computer for adjusting the size of the output opening in response to commands from the computer.

13. An apparatus for emulating various night sky illumination conditions comprising:
   a plurality of electrically-powerable LEDs disposed in an array, the LEDs having respective spectral curves centered at different wavelengths in the 0.4 to 2.5 micron range;
   a programmable computer;
   a copper plate thermally connected to the LED array;
   a temperature sensor connected to the copper plate and to the computer for monitoring changes in the temperature of the LED array resulting from generation of heat by the LED array and feeding the information to the computer;
   a plurality of thermo-electric coolers connected to the copper plate for cooling the LED array;
   a temperature controller connected to the computer and to the coolers for driving the coolers in response to commands from the computer to cool the LED array;
   a heat sink connected to the coolers for removing heat generated by the coolers;
   a cooling fan disposed next to the coolers for removing heat generated by the coolers;
   a light intensity controller connected between the LED array and the computer for varying the light intensities of the individual LEDs in response to commands from the computer;
   an integrating sphere attached to the LED array, the sphere having an input opening for collecting light from the array and an output opening for outputting a uniform distribution of the light collected front the array; and
   an iris mounted on the output opening of the integrating sphere and connected to the computer for adjusting the size of the output opening in response to commands from the computer.

14. A method of emulating spectral signatures comprising the steps of:
   (a) electrically powering a plurality of LEDs in an array, the LEDs having respective spectral curves centered at different wavelengths in the visible to the short wave infrared wavebands;
   (b) fixing the temperatures of the LEDs to avoid temperature-induced changes in their spectral curves;
   (c) varying the light intensities of the individual LEDs so that the combination of their spectral curves matches the spectrum of an illumination condition to be emulated; and
   (d) regulating the total amount of light collected from the array so that the cumulative spectrum has the same intensity as the illumination condition to be emulated,
   wherein step (d) includes:
   collecting light from the array and outputting a uniform distribution of the collected light through an opening, and
   adjusting the size of the opening.

15. The method recited in claim 14 wherein step (b) includes:
   monitoring heat-generated changes in the temperature of the LED array.

16. The method recited in claim 15 wherein step (b) includes:
   feeding the monitored changes to a programmable computer.

17. The method recited in claim 14 wherein step (b) includes:
   cooling the LED array.

18. A method of emulating various spectral signatures comprising the steps of:
   (a) electrically powering a plurality of LEDs in an array, the LEDs having respective spectral curves centered at different wavelengths in the visible to the short wave infrared wavebands;
   (b) fixing the temperatures of the LEDs to avoid temperature-induced changes in their spectral cvrves;
   (c ) varying the light intensities of the individual LEDs so that the combination of their spectral curves matches the spectrum of a known night sky illumination condition to be emulated; and
   (d) regulating the total amount of light collected from the array so that the cumulative spectrum has the same intensity as the known night sky illumination condition to be emulated,
   wherein step (d) includes:
   collecting light from the array and outputting a uniform distribution of the collected light through an opening,
   adjusting the size of the opening in response to commands from a programmable computer.

* * * * *